Sept. 8, 1959     N. J. NITKA ET AL     2,902,825
HYDRAULIC MACHINE WITH FLOW RATE RESPONSIVE SPEED CONTROL
Filed March 20, 1958     2 Sheets-Sheet 1

INVENTORS
NORBERT J. NITKA
RICHARD E. DAVIS
ATTORNEY

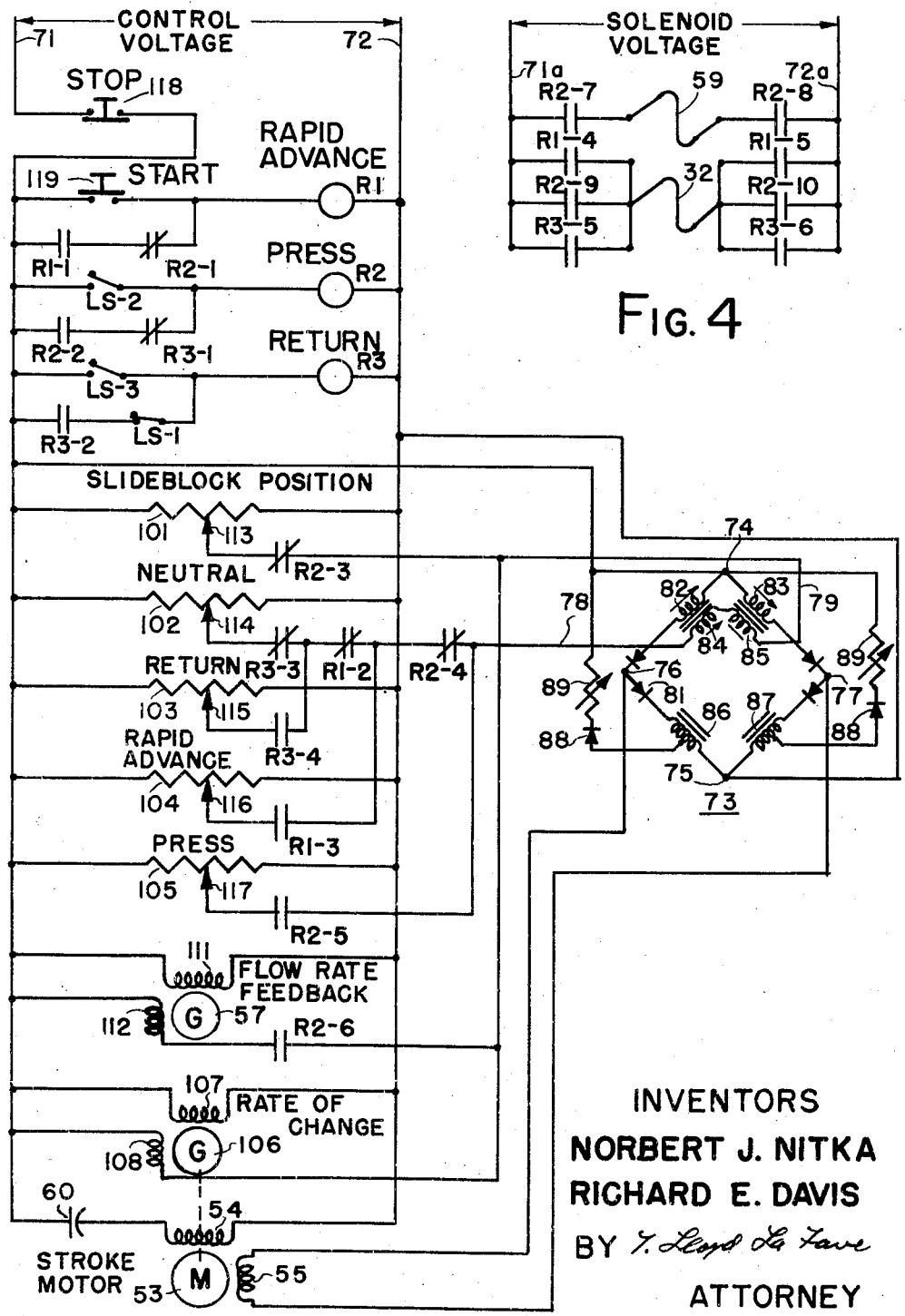

United States Patent Office 2,902,825
Patented Sept. 8, 1959

2,902,825

HYDRAULIC MACHINE WITH FLOW RATE RESPONSIVE SPEED CONTROL

Norbert J. Nitka, Waterford, and Richard E. Davis, Summit, Wis., assignors to The Oilgear Company, Milwaukee, Wis., a corporation of Wisconsin Application March 20, 1958, Serial No. 722,782

7 Claims. (Cl. 60—52)

This invention relates to a hydraulic machine including a hydraulic motor whose speed is controlled in response to the rate of flow of fluid between the hydraulic motor and a source of pressure fluid and more particularly to such a machine wherein the hydraulic motor includes a linearly movable actuating member.

The invention is embodied in a hydraulic machine having a hydraulic ram actuated member with the ram cylinder connected across the ports of a variable delivery reversible pump that is regulated by a flow rate responsive mechanism for controlling the speed of movement of the ram.

It has heretofore been proposed to control the speed of movement of a hydraulic ram by means of an electric generator driven by a roller in engagement with the ram with the output of the generator connected in an electric circuit controlling the opening and closing of a valve in the fluid supply line between the ram cylinder and a source of constant pressure fluid.

Such system has not been adopted as practical for controlling the speed of movement of a hydraulically driven linearly movable member, particularly where considerable hydraulic power is required to move such member and where such power must be applied as needed to maintain the speed constant without transmitting considerable shock to the system upon suddenly changing power demands. The heretofore proposed means for driving the electrical speed responsive control, moreover, is not sensitive to minor changes in the speed to be controlled, nor is it a feasible arrangement where the hydraulic motor is to be driven in either direction at appreciably different speeds.

It is therefore an object of the present invention to overcome the above disadvantages and provide a hydraulically operated machine with improved speed control means.

Another object of the invention is to provide electro-hydraulic means responsive to the flow rate of fluid between a hydraulic motor and a source of pressure fluid to maintain the speed of the hydraulic motor constant.

Another object of the invention is to provide a hydraulic ram with fluid at a pressure that is varied in proportion to the load on the ram by utilizing an electro-hydraulic speed responsive device to control the pressure of the source.

Another object of the invention is to supply fluid at a constant rate from a variable pressure source to a working cylinder of a hydraulically operated machine by means utilizing a voltage-producing flow rate responsive mechanism.

Another object of the invention is to provide a hydraulic system with an electro-hydraulic flow rate responsive mechanism to maintain the speed of movement of a hydraulic ram constant.

Another object of the invention is to provide a hydraulic machine having a hydraulically driven member supplied with fluid from a source whose flow rate is controlled over a gradient to provide a shock-free controlled working stroke for the hydraulically driven member.

Another object of the invention is to provide a flow rate responsive means between a hydraulic pump and hydraulic ram for maintaining ram speed constant.

Other objects and advantages will be apparent on consideration of the following description taken with the accompanying drawings, in which:

Fig. 3 is a wiring diagram of the electric control circuit for the machine of Fig. 1; and Fig. 4 is a portion of the control circuit showing a wiring diagram of the solenoid controlled valves of the hydraulic circuit of Fig. 1.

Figures 1, 2:
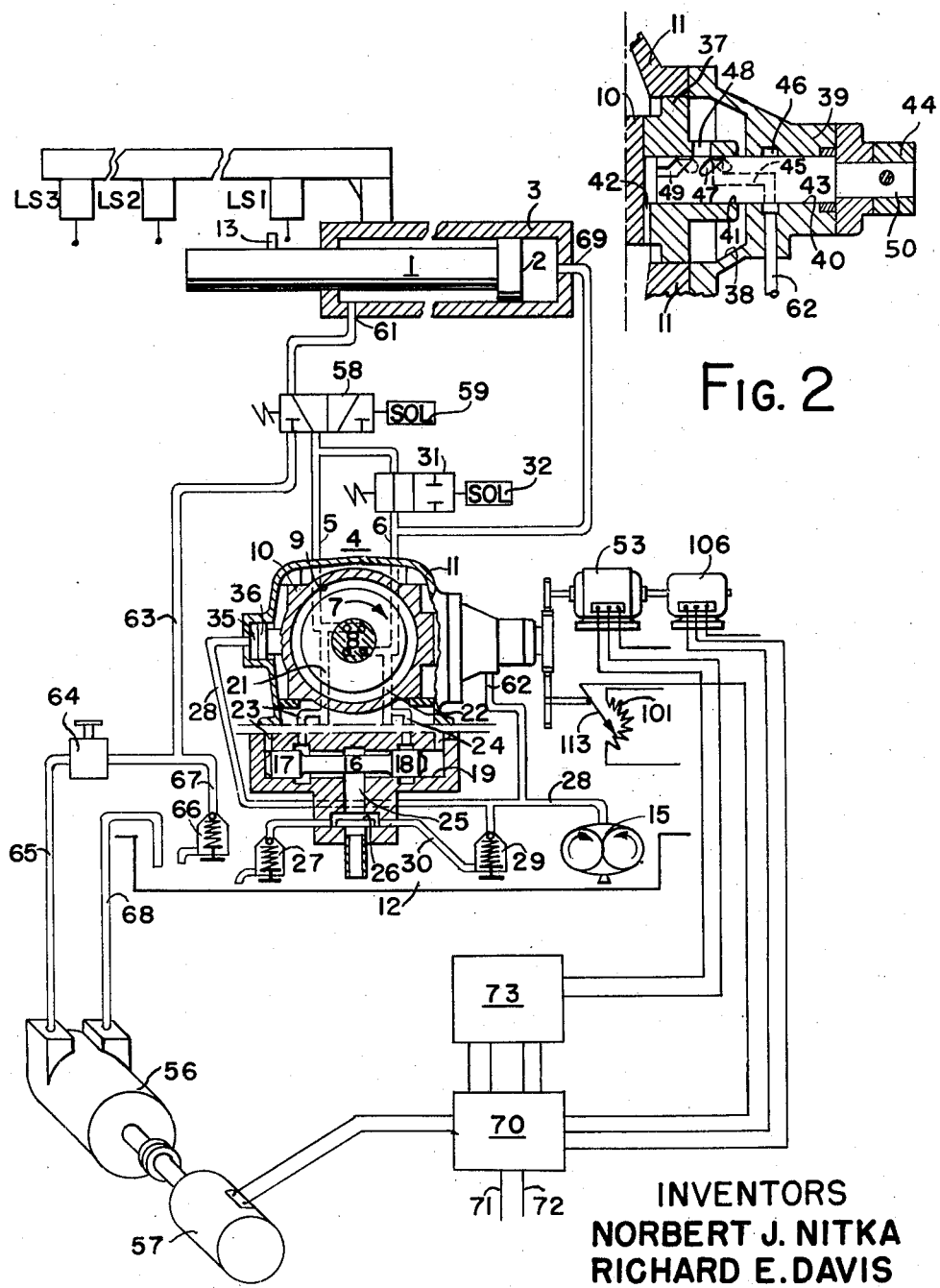
Fig. 1 is a schematic illustration of the hydraulic circuit and some elements of an electric control circuit of a speed controlled hydraulic machine embodying the present invention.
Fig. 2 is a sectional view of the rotary valve of Fig. 1 together with a coupled driving motor, feed-back generator, and potentiometer schematically illustrated.

Referring to the drawings, Fig. 1 shows a hydraulic machine, such as a hydraulic press, embodying the present invention. The hydraulic machine comprises a hydraulic ram 1 whose piston 2 is reciprocable in a cylinder 3 upon the delivery thereto of fluid under pressure from a reversible variable delivery pump 4.

Fluid discharged from the ram cylinder is returned directly to the pump, except that during the working or press portion of the ram stroke fluid discharged from the ram cylinder is diverted to drive a hydraulic motor-generator whose generated output is utilized to control the stroke of the pump and maintain the flow constant, as hereinafter described.

Pump inlet and outlet ports are connected to channels 5 and 6 which are connected to ports 61, 69 at opposite ends of the ram cylinder.

The pump is shown as a rolling piston type having its pistons and piston cylinders radially arranged in a cylinder barrel 7 which rotates on a stationary valve shaft or pintle 8 through which fluid is admitted and discharged from the pump. The pump pistons react against an annular reaction surface 9 carried by a variable displacement member 10 or slide block whose axis, when offset from the axis of cylinder barrel 7, determines the direction and rate of discharge of fluid from the pump.

Slide block 10 is arranged in the pump casing so that it can be moved only transversely of pintle 8. When the slide block is in its central or null position, its reaction surface is concentric with cylinder barrel 7, and the pump is at zero stroke. Displacing the slide block to the left of its center position causes the pump to discharge liquid to channel 5 for return through channel 6 when the pump is rotated clockwise, and for opposite displacement toward the right of the slide block the pump discharges liquid to channel 6 for return through channel 5.

The pump is provided with a reservoir 12 from which make-up fluid is supplied to the pump through an auxiliary pump shown as a gear pump 15, which may be driven in unison with the main pump in a known manner by means of a constant speed prime mover, not shown.

An automatic reversing valve 16, associated with the pump, has spaced apart pistons 17, 18 in a bore 19 in a valve body 20. Channels 21, 22 connect opposite ends of the valve body to the ports of the pump and also connect by branch channels to the valve body at spaced apart openings such that one is open between the pistons while the other is closed by the other piston when the valve is disposed toward either end of the valve bore. The valve bore between the pistons is open to the reservoir through a check valve 26 to permit the inlet port of the pump to freely draw from the reservoir. A low pressure relief valve 27 is connected to the chamber 25 located between check valve 26 and reversing valve 16.

The arrangement is such that the automatic reversing valve 16 blocks the pressure side of the pump from chamber 25, for pump discharge pressure actuates valve 16 to open only the inlet port of the pump to the reservoir.

Gear pump 15 supplies fluid for control purposes for displacing the pump slide block, and the remainder is discharged through a relief valve to chamber 25 and from chamber 25 through low pressure relief valve 27 to the reservoir 12.

The pump may also be provided with a normally open spring return solenoid valve 31 hydraulically connected between pump channels 5, 6 to by-pass pump output between pump ports when the solenoid 32 for valve 31 is not energized.

The pump delivers fluid upon displacement of the slide block from its neutral or no stroke position. A slide block positioning servo motor is disposed in the casing and comprises the pump casing provided with cylinders 35 and 38, Fig. 2, on the left and right sides of the slide block 10, and a piston 36 in cylinder 35 abuts the slide block and, under pressure, urges the slide block to the right. A piston 37 in cylinder 38 abuts the slide block and, under pressure, urges it to the left. Piston 37 is larger than piston 36 to provide a differential area for urging the slide block to the left when both pistons are subjected to the same fluid pressure.

Cylinder 35 is connected by a channel 28 to the discharge port of the gear pump. Cylinders 35 and 38 may be connected to a hydraulic servo motor which in turn is connected to a servo valve, but as shown in Figs. 1 and 2, cylinders 35 and 38 are connected directly to a servo valve 43. Thus, cylinder 38 is connected through rotary servo valve 43 and a channel 33 to the discharge port of the gear pump. The rotary valve 43 comprises end head 39 of cylinder 38 having a bore 40 in axial alignment with a bore 41 extending through piston 37 and a hub extension thereof. A radial passage 42 connects the bore 41 adjacent the slide block with the interior of the casing 11.

The valve 43 is disposed for rotation in the bores 40, 41 and is provided with a pair of spiral passages 47, 49 in its peripheral surface adjacent a port 48 in the hub of piston 37 that is adapted to communicate with either spiral groove 47 or 49, depending on the position of rotation of valve 43. Port 48 communicates with cylinder 38; spiral groove 49 extends to the end of the valve so that it may discharge fluid from cylinder 38 to the interior of the casing through radial groove 42. Spiral groove 47 is connected by an interior passage 45 in the valve, which opens to an annular groove 46 in the wall of the bore 40, which is connected to channel 62 for receiving fluid from the gear pump.

Since port 48 is disposed in the hub of piston 37, it moves therewith and with slide block 10 and causes port 48 to be blocked when the slide block has moved a distance proportional to the rotation of the valve and equal to the axial distance along the spiral passage 47 or 49, represented by such rotation. Slide block 10, piston 37, and valve 43 therefore permit liquid to flow to or from cylinder 37 substantially only when valve 43 is rotating and cooperate, therefore, as a follow-up mechanism.

Valve 43 has a shaft portion 50 that extends through end head 39 and has a pinion gear 44 mounted on the end adapted to be driven through suitable speed reducing gearing by an electric motor 53, Figs. 1 and 3. The electric motor may be a torque type motor or, as shown, a dynamo type having two phase windings 54, 55.

The hydraulic circuit includes means operable to divert fluid discharged from cylinder 3 during a working stroke of the ram 1 to a rotary hydraulic motor 56 of the positive displacement type coupled to drive an electric generator 57. Such diverting means comprises a suitable solenoid operated valve, such as a two position spring returned valve 58 having a solenoid 59. Valve 58 normally connects cylinder port 61 with channel 5 and is operable upon energization of solenoid 59 to block channel 5 and connect cylinder port 61 to a channel 63 leading to the rotary hydraulic motor. A flow control valve 64 of any suitable known type is connected in the line of channels 63, 65 to limit the rate of flow of fluid to the motor 56 to a predetermined maximum for protecting the motor against excessive speeds. A safety pressure relief valve 66 is connected to a branch channel 67 in parallel with the flow control valve for by-passing the flow control valve to reservoir when the pressure reaches a predetermined maximum in channels 63, 67. Fluid diverted to the hydraulic motor 56 drives the motor and, upon discharge therefrom, returns by channel 68 to the reservoir 12.

The pump stroke varying motor 53 positions the rotary valve 43 in accordance with the value of a voltage error signal derived as the difference between a predetermined command signal and a flow rate feedback signal. The control equipment is designed for industrial convenience to operate from a source of 110 volts and 60 cycles, which provides the control voltage for the lines 71, 72 of the electric control circuit shown in Fig. 3 and illustrated by panel 70, Fig. 1, as the relay and control station. Fig. 4 shows a portion of the control circuit for the solenoid operated valves connected across solenoid voltage supply lines 71$^a$ and 72$^a$, which may be connected to lines 71, 72 directly or through a transformer, not shown.

This circuit includes an electric power amplifier 73 having input power terminals 74, 75 connected to the lines 71, 72 of the source of control voltage. The amplifier 73 is of a suitable known type and, as shown, comprises a bridge type magnetic amplifier which produces an output voltage only when the bridge circuit is unbalanced.

The bridge amplifier 73 has power input terminals 74, 75, output terminals 76, 77, and signal input terminals 78, 79 and comprises a saturable reactor and a rectifier 81 in each leg with the rectifiers 81 all similarly poled for the unidirectional flow of current between the power input terminals. Saturable reactors 82, 83 are disposed in legs adjacent power input terminal 74 and have control windings 84, 85, respectively, which are connected in series opposition to each other between the signal input terminals of the amplifier. Reactors 86, 87 are disposed in the other two legs, and each have a center tap connected through a rectifier and an adjustable resistor to the power input terminal 74 of the opposite legs to provide a saturation reset or adjustment means for their cores. The load or power output terminals of the amplifier are connected to winding 55 of the stroke control motor 53.

During the half cycle, when the load circuit to the electric motor is blocked by the rectifiers 81, an input signal current in the series opposing input control windings 84, 85 tends to further magnetize one core and demagnetize the other core of reactors 82, 83, and on the load conducting next half cycle one core reaches saturation before the other, with the time intervals between their saturation being proportional to the magnitude of the input signal. During this interval the bridge amplifier is unbalanced and supplies current to winding 55 of the electric motor 53. The resulting power supplied to motor 53 is in the form of pulses at a frequency equal to the supply frequency, in a direction dependent on the direction of unbalance of the amplifier, and at a magnitude proportional to the signal. In this arrangement the response time is independent of the gain of the amplifier and depends only on the frequency of the power source connected to the amplifier, thus effecting a very rapid response.

The electric circuit for the hydraulic machine includes means controlling cycle operation to position the pump displacement member or slide block 10 as necessary to automatically obtain the position and the speeds of movement of the hydraulic ram through preset commands obtained from the control circuit.

Potentiometers 101 to 105 and relays R1, R2, and R3 are suitably connected across the lines 71, 72 for application of control voltage to these elements. Adjustable taps of the potentiometers are connected through contacts of the relays to the signal input terminals of the amplifier to provide voltage command signals thereto. Winding 54 of electric motor 53, winding 107 of electric generator 106, and winding 111 of electric generator 57 are each connected across the lines of the control circuit for providing reference voltages to these machines. A capacitor 60 is connected in series with reference voltage winding 54. Electric motor 53 has a winding 55 connected to the output of the amplifier. Electric generators 57 and 106 have windings 112 and 108, respectively, each having one end connected to control voltage line 71 and the other end connected to signal input terminal 79 of the amplifier to provide feedback signals thereto.

For a predetermined constant speed of operation of the hydraulic ram, such as the speed during a working stroke of an extrusion press, a command signal of a predetermined voltage is supplied to the signal input terminals of the bridge amplifier. As shown in the electric circuit, Fig. 3, such command signal is obtained from press potentiometer 105, which has an adjustable tap 117 that is connected to signal input terminal 78. In opposition to the command signal, the other input signal terminal 79 is connected to a terminal of the signal producing winding 112 of the flow rate responsive generator 57. The other terminal of this winding is connected to line 71 of the control voltage source. The error signal, which is the difference between the command voltages and the generator voltages, controls the output of the amplifier and drives the amplifier in a direction to make the generator voltage follow the command voltage.

To obtain stability in the system, the electrical control is further provided with other feedback voltage signals, one of which is a dampening signal obtained by a generator 106 coupled to the stroke motor 53. Generator 106 produces a voltage proportional to the rate of change of the position of the slide block. This rate of change generator has a reference voltage winding 107 connected to the control voltage and a signal producing winding 108 having one terminal connected to line 71 of the control voltage and its other terminal connected to a signal input terminal of the amplifier. Another feedback voltage signal is obtained by a potentiometer 101 supplied with control voltage and having a tap 113 moved in accordance with the position of the slide block 10. This tap is rotated by the shaft of the stroke motor 53 and is connected to the same input signal terminal 79 of the bridge amplifier as is the flow rate generator signal winding, in opposition to the command signal.

In the case of an extrusion press, the following is a further description and operation of the hydraulic machine wherein it is desired to operate the hydraulic cylinder at various speeds, such as for return of the hydraulic ram, a rapid advance to a working position, and at a maintained constant speed during a working stroke of the ram, such as when material is to be extruded at a fixed rate. The return and rapid advance of the ram does not require maintenance of a constant speed, and the rapid advance, moreover, would cause overspeeding of the rotary hydraulic motor, which is preferably designed as a flow rate measuring device for only the relatively slow working stroke of the hydraulic ram.

Limit switches LS-1, LS-2, and LS-3 are mounted in predetermined fixed positions, Fig. 1, and are adapted to be engaged by the ram or as shown by a collar 13 on the ram as it moves to different positions.

In the position shown in Fig. 1 and Fig. 3, the limit switch LS-1 is in its normally closed position. Engaging start pushbutton 119 energizes relay R1 and closes contacts R1-1 to establish a holding circuit through normally closed contacts R2-1. R1-3 contacts are thereby closed and connect the tap 116 of rapid advance potentiometer 104 to the signal input terminal 78 of the amplifier through normally closed relay contacts R2-4 and thereby provide a rapid advance command to the amplifier.

The ram rapidly advances to a work stroke position, where it closes normally open limit switch LS-2 to cause energization of relay coil R2 and complete a holding circuit through contacts R2-2 and R3-1. Contacts R2-1 in the holding circuit for relay R1 therefore open, de-energizing relay R1 to open contacts R1-3, and operatively disconnect the rapid advance command potentiometer from the amplifier. The press or work stroke potentiometer is connected by contacts R2-5 to the signal input of the amplifier to thereby provide a work or press speed command signal to the amplifier. Closing of limit switch LS-2 also causes energization of the solenoid 32 of valve 31, which operatively connects the hydraulic motor to the discharge end of the ram cylinder and provides a flow rate responsive signal opposing the command signal for maintaining the flow rate constant.

At the end of the working stroke the ram closes limit switch LS-3, which causes energization of the coil of relay R3 and the closing of its holding circuit through contacts R3-2 and LS-1. Energization of relay R3 opens contacts R3-1 to de-energize relay R2 whose contacts R2-7 and R2-8 return to open position thereby de-energizing the solenoid 59 to operatively disconnect the hydraulic motor 56 from the cylinder and to connect the pump channel 5 to the ram cylinder 3. Relay R2 also then being de-energized, contacts R2-5 open to disconnect the tap 117 of the work or press stroke command potentiometer from the amplifier. Contacts R3-4 are also thereby closed and connect the tap 115 of return potentiometer 105 to the amplifier signal input through normally closed contacts R1-2 and R2-4 to thereby provide a return command voltage signal to the amplifier.

At the end of the ram return the ram 1 opens limit switch LS-1, thereby de-energizing the coil of relay R3, which in turn closes contacts R3-3 and connects the tap 114 of neutral command potentiometer 102 through normally closed contacts R1-2 and R2-4 to the signal input terminal 79 of the amplifier.

An additional two position, spring returned, solenoid operated, normally closed valve shown in Fig. 1 is connected across the pump ports for by-passing pump output when the stop pushbutton is opened or upon power failure, Fig. 3.

When the stop pushbutton 118 is operated, or upon failure of electric power, the normally open safety by-pass valve 31 connected across pump ports has its solenoid de-energized to connect pump ports together.

Although but one embodiment of the present invention has been shown and described, it will be apparent to one skilled in the art that various changes and modifications may be made therein without departing from the spirit of the invention and the scope of the appended claims.

We claim:
1. A hydraulic machine comprising in combination a hydraulic cylinder, a ram reciprocable in said cylinder, a hydraulic pump connected across said cylinder and having a displacement varying member, force producing electric means including a winding operatively connected to said displacement varying member to shift said member for varying the output of said pump, an electrical amplifier connecting said winding to a source of electric power, means controlling the output of said amplifier comprising a rotary hydraulic motor operatively connected to said cylinder and driven by fluid discharged therefrom in response to movement of the ram, an electric generator coupled to said hydraulic motor and electrically connected to said amplifier to supply a voltage signal thereto, and a source of reference voltage connected to said amplifier to provide a predetermined speed command signal thereto, whereby said amplifier supplies said winding with electric power proportional to the difference of said signal voltages to maintain the rate of flow of fluid discharged from said cylinder at a predetermined value.

2. In a hydraulic press, the combination comprising a hydraulic cylinder, a ram reciprocable in said cylinder, a hydraulic pump connected across said cylinder and having a displacement varying member, an electric motor operatively connected to said displacement varying member to shift said member for varying the output of said pump, an electrical amplifier connecting said electric motor to a source of electric power, means controlling the output of said amplifier during a working stroke of the ram comprising a rotary hydraulic motor, valve means operatively connecting said rotary hydraulic motor between said cylinder and said pump only during said working stroke of said hydraulic ram, an electric generator coupled to said hydraulic motor and electrically connected to said amplifier to supply a voltage signal thereto, and a source of reference voltage connected to said amplifier to provide a predetermined speed command signal thereto, whereby said generator is operative only during said working stroke to control the power said amplifier supplies to said electric motor to maintain the rate of flow of fluid between said cylinder and pump constant during said working stroke.

3. In a hydraulic machine comprising a hydraulic cylinder and a ram reciprocable in said cylinder, the combination comprising said cylinder, said ram, a variable delivery hydraulic pump connected to supply fluid under pressure to one end of said cylinder, said pump having a stroke varying displacement member determining the output of said pump, control means for positioning said displacement member including a source of pressure fluid, a hydraulic servo motor, a servo valve including a valve member positionable for operatively connecting said hydraulic servo motor to said source, an electric motor having a movable member operatively connected to the valve member of said servo valve, a source of electric power, an electric amplifier having input terminals connected to said source of electric power and output terminals connected to said electric motor, means supplying a speed command signal voltage to said amplifier, a rotary hydraulic motor hydraulically connected to the other end of said cylinder so that fluid discharged therefrom drives said hydraulic motor, an electrical generator coupled to said rotary hydraulic motor and electrically connected to said amplifier to supply a control voltage thereto opposed to said speed command voltage, whereby the stroke of said pump is varied to maintain the output thereof at a predetermined value.

4. In a hydraulic press having a hydraulic cylinder and a ram reciprocable in said cylinder and movable at a fast speed for rapid advance and at a relatively slow speed for a working stroke, the combination comprising said cylinder, said ram, a variable delivery hydraulic pump connected to one end of said cylinder to supply fluid under pressure thereto for moving said ram through the working stroke, a displacement member in said pump being shiftable to vary the output of said pump, an electro-hydraulic means mounted on said pump and operable to shift said displacement member, said electro-hydraulic means including an electrical winding, a source of electric current, a control means connecting said source of current to said winding, said control means having a command voltage for predetermining the rate of fluid flow from said pump, a rotary hydraulic motor, a discharge conduit connecting the other end of said cylinder to said rotary hydraulic motor so that fluid discharged therefrom drives said rotary hydraulic motor, an electric generator coupled to said rotary hydraulic motor and electrically connected to said control means to supply a voltage thereto opposed to said command voltage whereby said control means supplies current to said winding in proportion to the difference of said command and generator voltages, and means including a normally open solenoid operated valve connected to said discharge conduit for normally by-passing fluid discharged from said cylinder from said rotary hydraulic motor, and switch means actuated by said ram to close said by-pass valve so that said rotary hydraulic motor is operatively connected to said cylinder only during the working stroke of said ram.

5. In a hydraulic press having a hydraulic cylinder and a ram reciprocable in said cylinder and movable rapidly in advance of a working portion of the stroke of the ram, movable relatively slowly and at a constant speed through the working stroke, and movable rapidly in the return of the ram, the combination comprising said cylinder, said ram, a reversible variable delivery hydraulic pump having inlet and outlet ports normally connected to opposite ends of said cylinder to supply fluid under pressure to one of said ends of said cylinder and receive fluid discharged from the other end of said cylinder, a displacement varying member in said pump shiftable to vary the output of said pump, electro-hydraulic means mounted on said pump and having a winding which when energized causes said electrohydraulic means to shift said pump displacement member in accordance with the power supplied to said winding, a source of electric power connected to an amplifier and said amplifier connected to said winding, a control circuit connected to said amplifier including switch means operated by movement of said ram to rapid advance, work and return stroke positions for applying predetermined voltage command signals to said amplifier, a rotary hydraulic motor coupled to an electric generator connected in said control circuit and operable to provide a voltage signal in opposition to the command signal, and valve means operable on the advance movement of said ram to a work stroke initiating position to operatively disconnect said pump and connect said rotary hydraulic motor to the discharge end of said cylinder during said working stroke and operatively disconnect said rotary hydraulic motor and reconnect said pump to said discharge end of said cylinder upon completion of said working stroke of said ram.

6. A hydraulic machine comprising a hydraulic cylinder, a ram movable in said cylinder, a variable delivery hydraulic pump normally connected across said cylinder, servo motor means including a valve operable to control the stroke of said pump, an electric motor coupled to said valve, means controlling said electric motor comprising an electrical tachometer generator operatively connected thereto, a rotary hydraulic motor coupled to drive said tachometer generator, and valve means operable to hydraulically connect a discharge end of said cylinder to said rotary hydraulic motor.

7. A hydraulic machine comprising a cylinder, a hydraulic pump connected to supply fluid under pressure to said cylinder, a ram movable in said cylinder for a working stroke upon the application of fluid under pressure to one end of said cylinder, a rotary hydraulic motor operatively hydraulically connected to the other end of said cylinder to be driven by fluid discharged from said cylinder, an electric generator coupled to said hydraulic motor, said pump having a displacement member for varying the stroke of the pump, a hydraulic servo motor operative to position said displacement member, a source of fluid pressure, a valve operatively connecting said servo motor to said source of fluid pressure, an electric motor coupled to said valve, a source of electric power, and means connected to said electric motor, to said source of power and to said generator, said means being operative to admit power from said source to said electric motor in accordance with the voltage of said generator.

References Cited in the file of this patent

UNITED STATES PATENTS

| | | |
|---|---|---|
| 2,227,814 | Tyler | Jan. 7, 1941 |
| 2,331,218 | Montelius | Oct. 5, 1943 |
| 2,596,988 | Kent | May 20, 1952 |